United States Patent [19]

Possati

[11] 4,112,629
[45] Sep. 12, 1978

[54] MEASURING AND CONTROL APPARATUS FOR INTERNAL GRINDING MACHINES

[75] Inventor: Mario Possati, Bologna, Italy

[73] Assignee: Finike Italiana Marposs Soc. in Accomandita Semplice di Mario Possati & C., Bentivoglio, Italy

[21] Appl. No.: 791,881

[22] Filed: Apr. 28, 1977

[30] Foreign Application Priority Data

May 5, 1976 [IT] Italy .................. 3418 A/76

[51] Int. Cl.² ........................... B24B 49/04
[52] U.S. Cl. ................................. 51/165.93
[58] Field of Search ........... 51/165 R, 165.88, 165.91, 51/165.93

[56] References Cited
U.S. PATENT DOCUMENTS

| | | | |
|---|---|---|---|
| 2,010,706 | 8/1935 | Williams | 51/165.91 X |
| 2,680,939 | 6/1954 | Humes | 51/165.91 X |
| 2,845,755 | 8/1958 | Price | 51/165.91 X |
| 2,923,106 | 2/1960 | Reusser | 51/165.88 |
| 3,417,512 | 12/1968 | Robillard | 51/165.91 |
| 3,807,098 | 4/1974 | Schaller | 51/165.91 X |
| 3,898,440 | 8/1975 | Fukuma | 51/165.91 X |

*Primary Examiner*—Harold D. Whitehead
*Attorney, Agent, or Firm*—Stevens, Davis, Miller & Mosher

[57] ABSTRACT

A measuring and control apparatus for internal grinding machines with resting shoes for cooperating with the outer surface of a workpiece, including a control device for controlling the displacement of the grinding wheel relative to the workpiece, with devices for measuring the displacements; and measuring devices for carrying out measurements of linear dimensions of the workpiece, the devices means for measuring dimensions of the workpiece including a first measuring device adapted to provide a signal responsive to the value of the diameter of said outer surface of the workpiece. The control device is connected to the device for measuring the dimensions of the workpiece for receiving the signal from the measuring device and for controlling the displacement of the grinding wheel relative to the workpiece depending on the signal itself, for the grinding of an inner surface of the workpiece concentric with said outer surface.

6 Claims, 4 Drawing Figures

MEASURING AND CONTROL APPARATUS FOR INTERNAL GRINDING MACHINES

The present invention relates to a measuring and control apparatus for internal grinding machines with resting shoes for cooperating with the outer surface of the workpiece, including control means, for controlling the displacement of the grinding wheel with respect to the workpiece, with means for measuring the displacements; and measuring means for carrying out measurements of linear dimensions of the workpiece.

Internal grinding machines with resting shoes provided with apparatuses for carrying out measurements of linear dimensions on the workpieces, for controlling and regulating the machine and particularly its grinding wheel, are already known. In these known machines the internal diameter of the workpiece is measured during the machining ("in process") by a gauge connected to control devices of the grinding machine, which command the grinding process depending on the instantaneous measured values of the diameter. The control devices include stepping-motor or similar control systems, which control the feed and the positioning of the grinding wheel, while permitting measurements of the relevant displacements. External grinding machines are known too, in which the machining cycle control is dependent on the measurement of the outer diameters of the workpieces, carried out after the machining.

Depending on the measurements made and/or combinations and processings of them (e.g. arithmetical means of a pre-set number of subsequent measurements), correction displacements of the tool are controlled, and so on. In these machines, therefore, the measurements on the workpiece are of "post-process" type.

Other known machines, in which in process measurements on the workpieces are made, are constituted by grinding machines for external grinding on male parts to be matched with female parts. The female part is measured on a bench while contemporaneously the male part is measured in-process and the machine control is made depending on the comparison of the measurements and the value of the desired play in the matching.

As to the in-process measurements, it is pointed out that they cannot be carried out always, due to the practical impossibility of housing the gauge on the grinding machine. However, when possible the in-process measurements take place under rather adverse conditions, which sometimes cause measurement errors from lack of precision, poor efficiency of the machine or failure of the gauge. This is due, for example, to the flow of coolant running over the workpiece and the gauge, the heating, the vibration and strain of the workpiece, the necessity to lengthen the operating cycle in order to carry out the measurements, possible impact of the gauge against the workpiece or the grinding wheel, or the explosion of the grinding wheel. These are relatively frequent for the internal grinding machines having high production. For the internal grinding machines with resting shoes in which in-process measurement is carried out, there are further problems, besides those mentioned above, due to possible changes of the outer diameter of the workpieces.

As a matter of fact, due to these changes, the gauges with two contact feelers measure along a chord line of the workpiece, and not along a diameter, while for the gauges having a single contact feeler every displacement of the feeler due to changes of the outer diameter causes measurement errors.

In the control apparatuses based on post-process measurements it is generally difficult to obtain acceptable compromises considering the opposite requirements of machining accuracy, promptness and stability of the correction controls. In particular, the arrival at the machine of anomalous workpieces (e.g. workpieces having too high a value of stock with respect to the normal value) can cause wrong machinings of both the anomalous workpieces and subsequent workpieces.

An object of the invention is to realize a measuring and control apparatus for an internal grinding machine, which provides control of the tool feed depending on the value of workpiece measurements even when in-process measurements cannot be carried out or in any case are difficult, and which assures high accuracy and efficiency. Another object of the invention is to realize a measuring and control apparatus permitting improved safeness and/or accuracy of the machining when anomalous workpieces arrive at the machine.

A further object of the invention is to realize an apparatus particularly suitable for controlling grinding machines for grinding the inner surface of bearing rings, whose outer surface cooperates with resting shoes.

These and other objects and advantages of the invention are attained through an apparatus of the kind specified at the beginning of the present description, in which, according to the invention, means for measuring dimensions of the workpiece includes a measuring device adapted to provide a signal responsive to the value of the diameter of the outer surface of the workpiece and control means includes a control device connected to the device for measuring the dimensions of the workpiece for receiving the signal from it and for controlling the displacement of the grinding wheel with respect to the workpiece depending on the signal itself, for the grinding of an inner surface of the workpiece concentric with the outer surface.

The invention will be described in more detail with reference to the accompanying drawings, given by way of non-limiting example, wherein.

Figure 1:
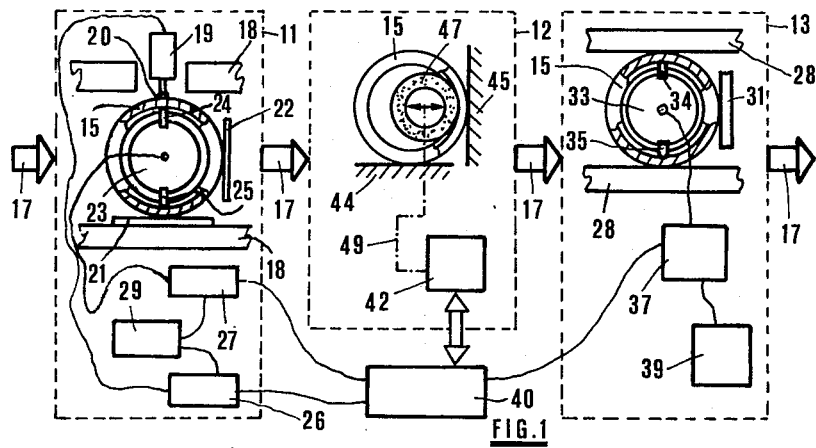
FIG. 1 is a diagrammatic showing of a grinding machine for machining internal grooves of bearing rings and an apparatus according to a preferred embodiment of the invention.

In FIG. 1 under reference numerals 11, 12, 13 there are shown, respectively, a first automatic measuring machine, a grinding machine of the type with resting shoes for the workpiece, for grinding the internal grooves of bearing rings, and a second automatic measuring machine. The two automatic measuring machines 11, 13, one located upstream and the other downstream of grinding machine 12, are of types substantially known per se. Their constructional details do not concern the present invention, so that there is shown only some elements of the machines. The rings 15 are conveyed to the first measuring machine 11, afterwards from it to grinding machine 12, then from the grinding machine to the second measuring machine 13, and finally removed from the second measuring machine through synchronous conveyors, substantially known per se, too, which carry out step movements and are provided with equally spaced seats for receiving the rings. In FIG. 1 the conveyors are symbolized through arrows marked by numeral 17.

The first measuring machine 11 includes a guide 18 leading rings 15 towards a measuring head 19 located at a side of the guide. Head 19 has a feeler 20 adapted to contact the outer surface of ring 15 and thrust the latter towards a mechanical reference 21 arranged opposite to guide 18. Another mechanical reference 22, which is movable, is adapted to block every workpiece arriving at machine 11, keep the workpiece together with reference 21 in a reference position during measurement and finally clear the passage so ring 15 can be output from machine 11.

Moreover, machine 11 includes a measuring plug 23 provided with two feelers 24, 25. Plug 23, axially movable, is inserted into ring 15 after the latter has been blocked in reference position and then carries out a measurement along the diameter of the inner groove of the ring.

Figure 4:
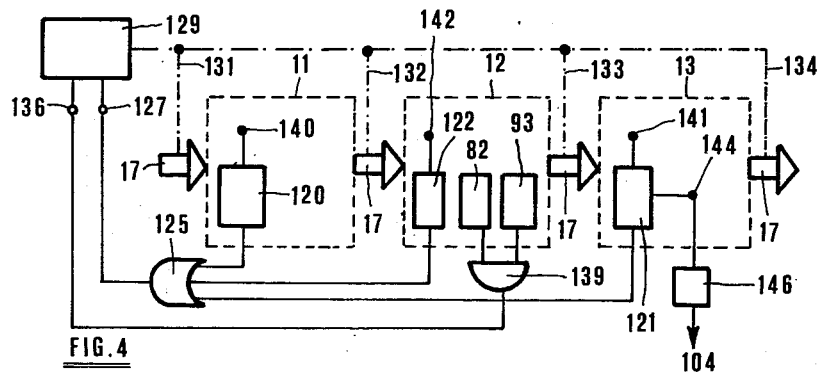
FIG. 4 is a block form diagram of the synchronizing and enable circuits of the apparatus of FIGS. 1 and 2.

Thereafter the plug returns to its rest position, by moving out of the ring. The displacement of plug 23 towards the measuring positions inside ring 15 and its return to rest position is controlled by probes, not shown in FIG. 1, which detect the positioning of the rings and the end of the relevant measurements. One of the probes is shown in FIG. 4, as it is described hereinafter. Head 19 and plug 23 are connected, respectively, to electric detecting and indicating units 26, 27, which provide signals proportional to the deviations of the outer diameter and the diameter of the inner groove of subsequent rings 15 from the relevant nominal values.

Moreover machine 11 includes a control group 29 which controls the cycles of operation. Group 29 is connected to units 26, 27. Measuring machine 13 includes a guide 28 leading ring 15 towards a movable mechanical reference 31, adapted to block the ring arriving, keep it in a reference position during the measurement and finally clear the passage for permitting the ring to output from machine 13. The measuring devices of machine 13 include a measuring plug 33 provided with two feelers 34, 35.

Plug 33, axially movable, is inserted into ring 15 for measuring the deviation, from the relevant nominal value, of the diameter of the inner groove, the surface of which has been previously ground. Plug 33 is connected to an electric detecting and indicating unit 37 which provides a signal proportional to said deviation. Moreover machine 13 includes a control group 39, connected to unit 37.

Detecting and indicating units 26, 27 and 37 are connected to a processing and control unit 40, which, on its turn, is connected to a control group 42 of grinding machine 12. The other elements of a grinding machine 12 shown in FIG. 2 are constituted by two resting shoes 44, 45 on which ring 15, rotated by a magnetic spindle, not shown, rests with its outer surface, and by grinding wheel 47.

The radial displacements of grinding wheel 47 are controlled by control group 42 through the functional connection shown by dot-dash line 49.

Figure 2:
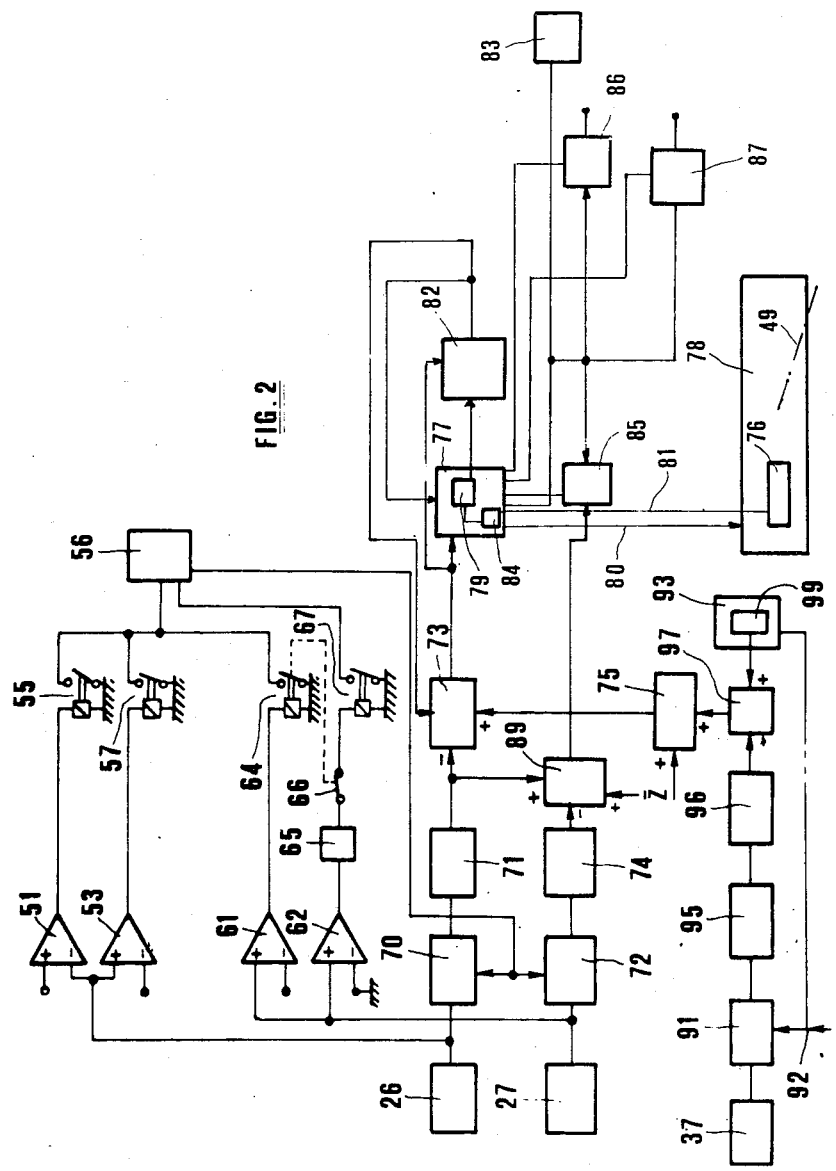
FIG. 2 is a block form diagram of the machine and the apparatus of FIG. 1.

With reference to FIG. 2, the output of unit 26, where there is a signal proportional to the deviation $S_E$ of outer diameter $D_E$ of ring 15 measured by head 19, from the nominal value $D_{En}$, is connected to the negative input of a comparator 51 and to the positive input of a comparator 53. Comparator 51 receives at the positive input a voltage proportional to the (negative) value $S_{Ei} = D_{Ei} - D_{En}$, wherein $D_{Ei}$ is the lower limit of tolerance of outer diameter $D_E$. Comparator 53 receives at the negative input a voltage proportional to a value $S_{Ea} = D_{Ea} - D_{En}$, the meaning of which will be explained herebelow.

Between the output of comparator 51 and ground is connected the coil of a relay 55 having a contact, open in rest conditions, arranged in an input circuit of an ejection device 56 which is part of machine 11.

Between the output of comparator 53 and ground is connected the coil of a relay 57 having a contact, open under rest conditions, arranged in said input circuit of ejection device 56.

The output of unit 27, receives a signal proportional to the deviation $S_I$ of diameter $D_I$ of the inner groove of ring 15 from the nominal value $D_{In}$, and it is connected to the positive inputs of two comparators 61, 62. Comparator 61 receives at its negative input a voltage proportional to the value $S_{Is} = D_{Is} - D_{In}$, where $D_{Is}$ is the upper limit of tolerance of inner diameter $D_I$.

Comparator 62 has its negative input connected to ground. Between the output of comparator 61 and ground there is connected the coil of a relay 64 having a first contact, open under rest conditions, connected to said input circuit of ejection device 56.

Finally, between the output of comparator 62 and ground there are connected in series a delay circuit 65, a second contact 66, closed under rest conditions, of relay 64, and the coil of a relay 67 having a contact, open under rest conditions, connected to another input circuit of ejection device 56.

Comparator 51 generates an output signal which energizes the coil of relay 55, closing the relevant contact, when the condition $D_E < D_{Ei}$ takes place, that is when the measured ring 15 is a scrap part irreclaimable by further machinings, since it has outer diameter below the lower limit of tolerance.

Comparator 61 generates an output signal which energizes the coil of relay 64, closing the relevant contact, when the condition $D_I < D_{Is}$ takes place, that is when the measured ring 15 is a scrap part, irreclaimable because the diameter of its inner groove is above the upper limit of tolerance. In this condition, also comparator 62 is triggered, but the presence of delay circuit 65 and the opening of contact 66 prevent the energization of the coil of relay 67.

When the condition $D_{Is} > D_I > D_{In}$ takes place, the output signal generated by comparator 62 energizes the coil of relay 67, closing the relevant contact open in rest condition. The closure of the contact of relay 55 or of that, open under rest conditions, of relay 64 causes the operation of ejection device 56, which ejects, through a first ejection outlet of machine 11, the irreclaimable scrap parts, preventing their displacement towards grinding machine 12.

Ejection device 56 also intervenes as a consequence of the actuation of relay 67, but in this case the ejection of the relevant ring is carried out through a second outlet of machine 11. As a matter of fact the workpiece, apart from possible shape errors of the inner groove, has diameter $D_I$ above the nominal value, but within the tolerance range.

Finally ejection device 56 also intervenes after the actuation of relay 57, for preventing grinding machine 12 from receiving rings 15 having dimensions which would bar or render unsafe the insertion of the grinding wheel 47 into the bores of the rings. To this purpose, the reference value $S_{Ea} = D_{Ea} - D_{En}$ is chosen depending on the limit value $D_{Ea}$, below which it is sure that rings 15 — normally measured in measuring machine 15, after insertion of plug 23 — permit, when located on shoes 44, 45, the insertion of grinding wheel 47, also supposing that this insertion must take place in the most critical condition as to the diameter of the grinding wheel, the position and wear of shoes 44, 45 and so on. Moreover unit 26 is connected to the input of a delay circuit 70 having a terminal for zero-setting control connected to an output circuit of the ejection device 56 and an output connected to an analogue-to-digital converter 71 which converts the analogue signal into a digital signal in BCD (Binary Coded Decimal) code. Similarly unit 27 is connected to the input of a delay circuit 72 having a zero-setting terminal connected to said output circuit of the ejection device 56 and an output connected to an analogue-to-digital converter 74 which converts the analogue signal into a digital signal.

Delay circuits 70 and 72 are foreseen as taking into account the delay occurring from the "pre-process" measurements of rings 15 on machine 11 to the subsequent machining in grinding machine 12. The delay circuits are at once zero-set by a signal provided by the already mentioned output circuit of ejection device 56 when the latter ejects a ring, preventing in this way that measurements of ejected rings reach grinding machine 12.

The output of converter 71 is connected to the negative input of a difference circuit 73 which receives at a positive input the signal coming from an output of a summing circuit 75. With reference to converter 71, it is evident that although for simplicity's sake previously and herebelow reference has been made to an "output" of the converter and a single-wire connection has been shown in the drawings, in actual fact the converter has several terminals and output connections, for permitting a parallel transfer of digital signals. Similar comments are also valid for other circuits.

The summing circuit 75 receives at an input a digital signal, in BCD code, indicative of a pre-set number $\overline{Z}$ of feed steps of grinding wheel 47 and at another input a signal indicative of a correction of the value $\overline{Z}$ obtained depending on the diameter measurement made on machine 13 and/or regulations made on grinding machine 12, as it will be explained herebelow. The output of difference circuit 73, on which there is a signal indicative of a desired number Z' of feed steps of the grinding wheel, corrected with regard to value $\overline{Z}$ taking into account both the pre-process and the post-process measurements, is connected to the input of a control unit 77 which controls the operation of a stepping-motor 78. Stepping motor 78 carries out, through the connection 49 the grinding wheel 47 movements of fast approach, feed and retraction.

The functional connection 80 between unit 77 and motor 78 has the function of transmitting to the latter the driving pulses which control the steps of movement of the motor. The connection 81 from an encoder 76 coupled to motor 78 and to unit 77 transmits to unit 77 signals indicative of the steps made by motor 78 in clockwise or counterclockwise direction.

Unit 77, of a type substantially known per se, includes circuits which provide voltage references, circuits which convert these references into frequency signals, driving circuits of motor 78, a receiver 84 of the signals of encoder 76 and a counter 79 which counts the steps made by motor 78 both in the phase of retraction of grinding wheel 47 from the ground surface and in the approach and machining phases.

A comparator 82 receives at a first input, from counter 79, a signal in BCD code indicative of the steps Z(t) made by motor 78 in the phases of grinding wheel retraction and at a second input the signal, in BCD code, present at the output of difference circuit 73. When the two input signals of comparator 82 become equal, the comparator provides at its output connected to unit 77 a signal for control of cycle end and, subsequently, a signal to start the phase of approach of the grinding wheel towards the surface of a new ring to be ground.

The signal controlling the end of the cycle also controls the cancellation of the signal indicative of the number of steps Z' made, forwards and backwards, by grinding wheel 47 for the ring 15 previously ground.

An indicating device 83 receives at its input from an output of unit 77 a signal in BCD code indicative of the difference between the number Z' and the steps made forwards by grinding wheel 47. This output of unit 77 is also connected to relevant inputs of three comparators 85, 86, 87.

Comparator 86 receives at a second input a signal in BCD code indicative of the theoretical stock $|S_{f1}| = |D_{f1} - D_{In}|$ of the inner groove of rings 15 in correspondence with which it is desired to obtain the passage from rough grinding speed to fine grinding speed. When the two signals at the inputs of comparator 86 are equal, the comparator controls, through an output connected to unit 77, said passage. Similarly, comparator 87 receives at a second input a signal in BCD code indicative of the theoretical stock $|S_{f2}| = |D_{f2} - D_{In}|$ of the inner groove of rings 15 in correspondence with which it is foreseen to carry out a spark-out phase. When the two signals at the inputs of comparator 87 are equal, the comparator controls, through an output connected to unit 77, the end of the fine grinding phase and the start of the spark-out phase, the duration of which is adjusted through a timer, not shown. Comparator 85 has another input connected to the output of a difference circuit 89. Circuit 89 has two inputs, the first of which, negative, connected to the output of converter 74, while at the second, positive, input there is present a reference signal indicative of a value K the meaning of which will now be explained. The output signal of circuit 89, indicative of the value $-S_I + K$ ($S_I$ is normally negative), is used for controlling, through comparison with the signal received from the first input of comparator 85, the end of the fast approach displacement (end of the "air cut") of the grinding wheel 47 towards the surface of the groove of workpiece 15 and the start of the rough grinding phase. This control is operated through an output connected to unit 77, when the equality of the input signals of comparator 85 takes place. Since the setting of the controls of stepping motor 78 is made, as already mentioned, in such a way that when it is Z(t) = Z' grinding wheel 47 is in the position of being at the end of the retraction stroke from the workpiece and that when it is Z(t) = O the grinding wheel is in the position corresponding, at the end of the spark-out, to the attainment of the final inner diameter, theoretically equal to $D_{In}$, it follows that the theoretical condition in which — during the approach of the grinding wheel 47 towards workpiece 15 — the contact of the wheel with the surface to be ground takes place, is the attainment, on indicating device 83, of a counting $Z_c = |S_I|$.

It follows, then, that the control for the end of the "air cut" is operated when the counting on indicating device 83 has the value $Z_c + K$. The value K is set for anticipating, for purposes of safeness, the control operation with regard to the theoretical contact of the grinding wheel with the workpiece. The signal which reaches an input of summing circuit 75, for correcting the value $\overline{Z}$ depending on the post-process measurements made on machine 13 and/or depending on adjustments made on machine 12, is obtained as follows. The output of unit 37 is connected to the input of an inhibit circuit 91 which transmits or inhibits the input signal depending on the value of an enable signal present at a terminal 92 connected to an indicating circuit of a group 93 for dressing control of grinding wheel 47. Terminal 92 is also connected to the pushbutton for starting of the apparatus. A mean circuit 95 receives the signals transmitted through inhibit circuit 91 and carries out a mean $S_{Im}$ on a pre-set number of the same signals, or an exponential mean, for example as described in U.S. Pat. No. 3,809,874 and U.S. Pat. No. 3,983,376. The output of mean circuit 95 is connected to the input of an analogue-to-digital converter 96, having in its turn an output connected with the negative input of a difference circuit 97. The positive input of circuit 97 is connected to control group 93, while the output is connected to summing circuit 75. Control group 93 controls the dressing of grinding wheel 47 after the machining of a pre-set number of workpieces 15 has taken place and also controls the "grinding wheel compensation" operation.

In the apparatus shown in FIG. 2 the operation of grinding wheel compensation is made electrically. In fact, the connection between control group 93 and circuit 97 provides to the latter the progressively increasing sum, obtained through a totalizer circuit 99 of group 93, of the subsequent dressing amounts (or, since the dressing amount is usually constant, the product of this amount and number of dressing operations, which progressively increases until the replacement of the grinding wheel). The compensation signal is summed, in circuit 75, with the signal indicative of value $\overline{Z}$. The value $\overline{Z}$ is corrected by this compensation signal besides by a signal indicative of the mean deviation $S'_{Im}$ of diameter $D'_I$ of the workpiece ground just after every dressing operation, from nominal value $D_{In}$. In this way it is possible to compensate for the wear of the dressing device, that of the resting shoes and other sources of machining errors. As it is evident from what has been said above, the mean deviation $S'_{Im}$ is obtained because after every dressing operation group 93 provides to inhibit circuit 91 an enable signal which allows the passage of the postprocess measurement signals regarding a pre-set number of workpieces ground just after the dressing operation. A similar enable signal is sent to circuit 91 at the starting of the apparatus.

Figure 3:
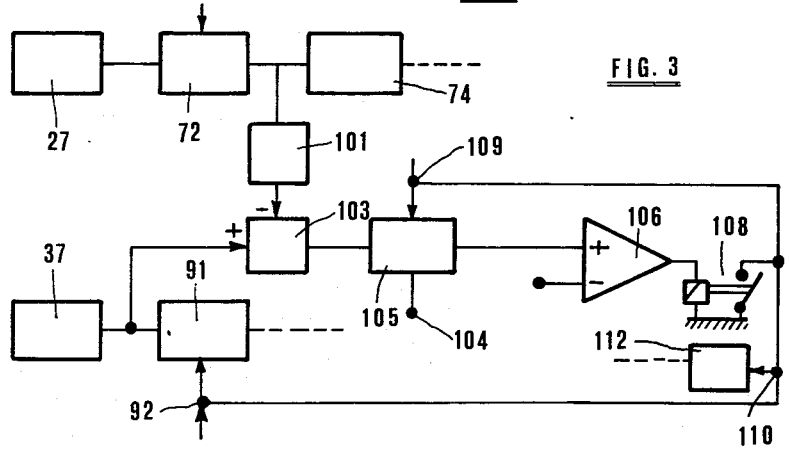
FIG. 3 is a block form diagram of a variant of the circuit for controlling the dressing of the grinding wheel of the machine of the preceding figures.

The circuit of FIG. 3 shows a further use of the pre-process and post-process measurements. This circuit enables controlling the dressing of grinding wheel 47 as soon as the grinding wheel has removed a pre-set amount of stock, rather than after the machining of a pre-set number of rings, as outlined with reference to FIG. 2. In this way the dressing is carried out more timely.

The output of delay circuit 72 is connected, through a further delay circuit 101, to the negative input of a difference circuit 103 which receives at the positive input the output signal of unit 37. Delay circuit 101 allows to obtain at the output of difference circuit 103 signals proportional to the difference of the stocks of a single ring before $(S_j)$ and after $(S'_j)$ machining. These signals reach the input of an integrating circuit 105 which calculates the sum of the stock amounts really removed by grinding wheel 47 from subsequent rings 15, up-dating this sum when a terminal 104 receives an enable signal, as it will be explained hereinafter. The output signal of integrator 105 reaches the positive input of a comparator 106 which receives at the negative input a pre-set reference voltage, indicative of the maximum amount of stock removable by a grinding wheel 47 maintaining a sufficient cutting capacity between one dressing and the subsequent dressing.

Between the output of comparator 106 and ground there is inserted the coil of a relay 108 having a contact, open under rest conditions, inserted in a connection with a zero-set terminal 109 of integrator 105 and in a connection with a terminal 110 of a dressing control circuit of a group for dressing control 112, substantially the same as group 93, at least for the mechanical parts.

Moreover, the contact of relay 108 is inserted in a connection with the already mentioned enable terminal 92 of the inhibit circuit 91 of the apparatus of FIG. 2, which otherwise is unchanged.

It is evident that a signal for dressing control is obtained, due to the closure of relay 108 contact, when the voltage at the positive input of comparator 106 goes above that present at the negative input. Moreover the closure of the contact causes the zero setting of integrator 105 and the generation of the enable signal to inhibit circuit 91.

Under numerals 120, 121, 122 there are shown in FIG. 4 probes, suitably arranged on measuring machines 11, 13 and on grinding machine 12, so as to feel the arrival and the positioning of the rings in the measurement and machining positions, respectively.

Probes 120, 121, 122 have outputs connected to relevant inputs of a logic summing circuit 125. The output of the logic summing circuit 125 is connected to terminal 127 of a control device 129, which controls conveyors 17 through connections symbolized in the figures by dot-dash lines 131, 132, 133, 134. Terminal 127 receives, as soon as a workpiece is positioned on at least one of machines 11, 13 and/or grinding machine 12, a signal which stops conveyors 17. Another terminal 136 of control device 129 is connected to the output of an AND 139 having two inputs connected to comparator 82 and control group 93, respectively.

When at the output of comparator 82 there is present the relevant control voltage (this also happens when no workpiece is present on the grinding machine), while at the same time the circuits of control group 93 provide a signal indicating the end of a dressing cycle of the grinding wheel or the lack of a dressing control, terminal 136 receives a consent for the movement of conveyors 17. Then the conveyors move synchronously, provided that a stop signal is not present on terminal 127.

Probes 120, 121, 122 have other outputs 140, 141, 142 which control, when the relevant probe feels the positioning of a workpiece, the starting of a cycle of the measuring machine 11 and/or 13 and/or of grinding machine 12.

These machines carry out then the relevant measurements and/or grinding cycles, which terminate with the removal of the workpiece from the measuring or working position and then the switching off, on terminals 127, of the stop signal for conveyors 17.

Probe 121 has a third output connected, through a delay circuit 146, to terminal 104 of integrator circuit 105, for controlling the up-dating of the calculation made by the same integrator circuit. The operation of the circuits of FIG. 4 will be now described with reference to some of the eight possible conditions which may take place as to the arrival of workpieces 15 to measuring machines 11, 13 and grinding machine 12.

If grinding machine 12 as well as measuring machines 11, 13 receive relevant rings 15, after a synchronous forward step of relevant conveyors 17 and the subsequent loading — through loading devices and/or guides for gravity sliding — in machining and measuring position, probes 120, 121, 122 control the stopping of conveyors 17 and the actuation of the relevant operation cycles of grinding machine 12 and machines 11, 13. The measuring cycles of machines 11, 13 end before that of the grinding machine. After the end of the latter and the end of a possible dressing cycle, conveyors 17 make another forward step, carrying the workpiece measured by machine 11 onto grinding machine 12 (provided that the workpiece is not ejected), the ground workpiece onto measuring machine 13 and the workpiece measured by this machine towards a container. In another possible condition, measuring machines 11, 13 receive relevant rings 15, while grinding machine 12 does not receive any ring. In this case machines 11, 13 carry out the measuring cycles, while grinding machine 12 does not operate. After the end of the measuring cycles, conveyors 17 carry out a further synchronous forward step.

The operation of the apparatus in the other possible circumstances is evident from what is explained above and therefore it is not described.

By means of the circuits of FIG. 4 and other auxiliary enable and control circuits of measuring machines 11, 13 and grinding machine 12, the synchronism of the pre-process measurements, the post-process measurements and the grinding operation is maintained and possible troubles, which may drive from variations of the duration of the grinding cycles and/or variations of the dressing times, are avoided.

The construction of the synchronizing and consent circuits may be different from that shown in FIG. 4, depending on the particular features of grinding machine 12 and measuring machines 11, 13. As a matter of fact, the invention may be used for different kinds of grinding machines and employing different measuring machines.

Therefore it is clear that the invention does not regard the particular construction of grinding machine 12 or measuring machines 11, 13 but the means which render the operation of the grinding machine dependent on the operations of the measuring machines, particularly the means through which the displacement of grinding wheel 47 is controlled depending on the values of the preprocess and post-process measurements. Measuring machines 11, 13 and grinding machine 12 are substantially known per se.

Measuring machines 11, 13 may be, in particular, of automatic or semi-automatic type, with incorporated devices for transporting, loading and unloading the workpieces, gravity sliding guides and so on. As already mentioned, the measurement of the diameter of the internal groove of the rings, made before the machining, can be utilized to modify the operating cycle of the grinding machine 12 in such a way as to control the end of the "air cut" depending on the initial stock value.

The regulation of the operating cycle depending on the initial stock value can also be extended to other phases of the machining, as described in Italian Pat. No. 968,059.

Measuring machines 11, 13 can be provided with further measuring gauges and devices, in such a way as to carry-out additional pre-process and post-process checkings and measurements.

These additional checkings and measurements may be used for controlling the grinding machine 12, for classifying the workpieces and for selecting them. In particular, it may be advantageously foreseen to carry out, on the different surfaces of each workpiece, measurements of concentricity errors, out-of-roundness, perpendicularity errors and so on.

What is claimed is:

1. A measuring and control apparatus for an internal grinding machine, the grinding machine including:
   resting devices for cooperating with the outer surface of the workpiece being machined; and control means for controlling the displacement of the grinding wheel relative to the workpiece, the control means including measuring means for providing a signal responsive to said displacement; the apparatus comprising:
   a measuring machine arranged upstream of the grinding machine for subsequently receiving and measuring the workpieces to be machined in the grinding machine, the measuring machine including a first gauge generating a signal responsive to the diameter of the outer surface of the subsequent workpieces; a second gauge generating a signal responsive to the diameter of the internal surfaces of the workpieces; and an ejection device;
   transfer means for transferring in succession workpieces from the measuring machine to the grinding machine and away from the grinding machine;
   processing means connected with said measuring machine, transfer means and control means for controlling their operation, the processing means including: comparison circuits connected with said first and second gauges and with said ejection device for controlling the ejection of scrap workpieces and that of workpieces having diameters which would render unsafe the machining operation; a first delay circuit connected with said first gauge and with said control means for setting the control means depending on the outer diameter of a workpiece to be machined; a second delay circuit connected with said second gauge; a comparator circuit connected with said first and second delay circuits and with the control means for controlling the change of the grinding wheel speed from fast approach speed to feed speed for stock removal; further comparator circuits connected with said control means for changing the grinding wheel feed speed during the stock removal depending on said signal responsive to displacement; and
   synchronizing means connected with said measuring machine, grinding machine and transfer means for synchronizing their operation.

2. A measuring and control apparatus for an internal grinding machine, the grinding machine including: resting devices for cooperating with the outer surface of the workpiece being machined; and control means for controlling the displacement of the grinding wheel relative to the workpiece, the control means including measuring means for providing a signal responsive to said displacement; the apparatus comprising:
- a first measuring machine arranged upstream of the grinding machine for subsequently receiving and measuring the workpieces to be machined, the measuring machine including an outer diameter gauge means for providing a signal responsive to the diameter of the outer surface of each workpiece to be machined;
- a second measuring machine arranged downstream of the grinding machine and including an internal diameter gauge means for providing a signal responsive to the diameter of the internal surface of each machined workpiece;
- transfer means for transferring the workpieces from the first measuring machine to the grinding machine and from the grinding machine to the second measuring machine;
- processing means connected with said measuring machines, transfer means, and control means for controlling their operation, the processing means including: first circuit means connected with said first measuring machine and said control means for providing to the control means a control signal for controlling the grinding wheel displacement for the machining of a workpiece previously measured by the first measuring machine depending on said signal responsive to the diameter of the outer surface of the workpiece; and second circuit means connected with said second measuring machine and said control means for providing to the control means a correction signal of said control signal for the control of the grinding wheel displacement for machining a workpiece, said correction signal being responsive to deviations — from a desired value — of the diameter of the internal surface of workpieces already machined; and
- synchronizing means connected with said first and second measuring machines, said grinding machine and said transfer means for synchronizing their operation.

3. A measuring and control apparatus for an internal grinding machine, the grinding machine including: resting devices for cooperating with the outer surface of the workpiece being machined; and control means for controlling the displacement of the grinding wheel relative to the workpiece, the control means including measuring means for providing a signal responsive to said displacement; the apparatus comprising:
- a first measuring machine arranged upstream of the grinding machine for subsequently receiving and measuring the workpieces to be machined, the measuring machine including a first gauge generating a signal responsive to the diameter of the outer surfaces of the subsequent workpieces and a second gauge generating a signal responsive to the diameter of the internal surfaces of the workpieces;
- a second measuring machine arranged downstream of the grinding machine and including a third gauge generating a signal responsive to the diameter of the internal surfaces of previously machined workpieces;
- transfer means for transferring in succession the workpieces from the first measuring machine to the grinding machine and from the grinding machine to the second measuring machine;
- processing means connected with said measuring machines, transfer means and control means for controlling their operation, the processing means including: first circuit means connected with the first measuring machine and the control means for providing to the control means control signals for controlling the machining of a workpiece previously measured by the first measuring machine depending on said signals generated by the first and second gauges, said control signals including signals for changing the displacement speed of the grinding wheel from fast approach speed to feed speed, for changing the value of the feed speed and for controlling the grinding wheel retraction stroke; and second circuit means connected with said second measuring machine and said control means for providing to the control means a correction signal responsive to deviations of the diameters of the internal surfaces of workpieces already machined from a desired value; and
- synchronizing means connected with said first and second measuring machines, said grinding machine and said transfer means for synchronizing their operation.

4. The apparatus according to claim 3, wherein said first measuring machine includes an ejection device arranged upstream of the grinding machine and wherein said processing means includes third circuit means connected with the first measuring machine for controlling the ejection of scrap workpieces and that of workpieces having outer and internal diameters which would render unsafe the operation of the grinding machine.

5. The apparatus according to claim 4, for a grinding machine including a dressing device for controlling the dressing of the grinding wheel, wherein said processing means includes fourth circuit means connected with said first and second measuring machines and with said dressing device, for calculating the total amount of stock removed from subsequent workpieces and for controlling dressing of the grinding wheel when said amount reaches a pre-set value.

6. The apparatus according to claim 3, for a grinding machine in which said control means comprises a stepping motor and stepping motor control means and said measuring means includes a device for calculating the steps carried out by the motor from determined positions, wherein said processing means is connected to the stepping motor control means and to the device for calculating the steps carried out by the motor.

* * * * *